(No Model.)
W. E. HASKINS.
WATERING TROUGH FOR CATTLE.
No. 383,124. Patented May 22, 1888.
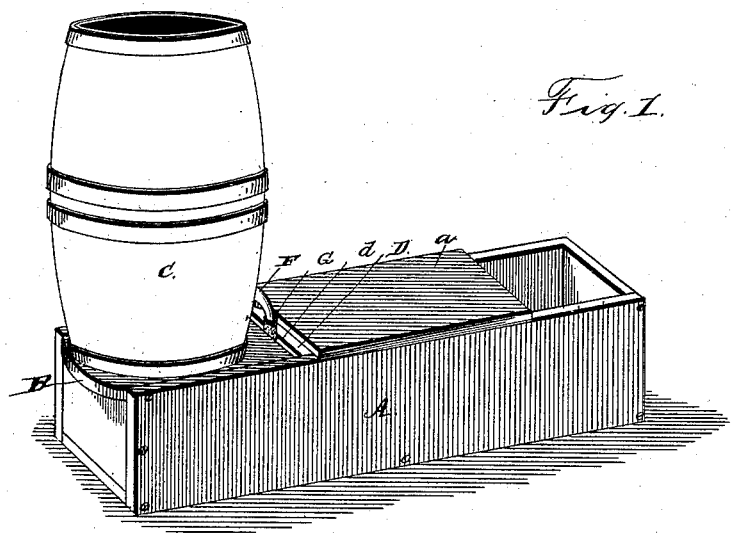
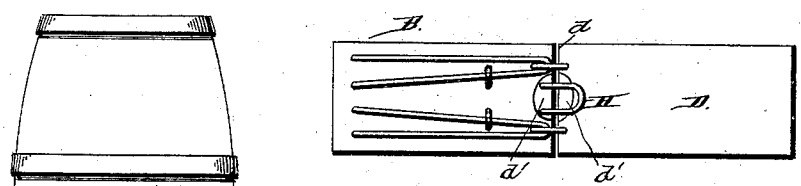
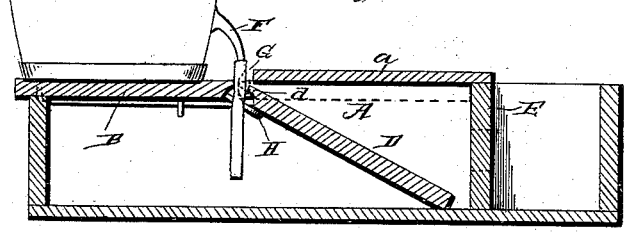
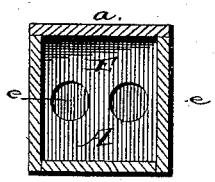
Witnesses.
Inventor.
Wm. E. Haskins.
By his Attorneys,

UNITED STATES PATENT OFFICE.

WILLIAM EDGAR HASKINS, OF SPARLAND, ILLINOIS.

WATERING-TROUGH FOR CATTLE.

SPECIFICATION forming part of Letters Patent No. 383,124, dated May 22, 1888.

Application filed January 27, 1888. Serial No. 262,108. (No model.)

*To all whom it may concern:*

Be it known that I, WILLIAM EDGAR HASKINS, a citizen of the United States, residing at Sparland, in the county of Marshall and State of Illinois, have invented new and useful Improvements in Watering-Troughs for Cattle, of which the following is a specification.

The invention relates to improvements in watering-troughs for cattle, the object being to cause the water from the tank to be cut off from the trough when it rises too high therein; and it consists in the construction and novel combination of means hereinafter described, illustrated in the drawings, and pointed out in the appended claim.

In the drawings, Figure 1 is a perspective view of the apparatus in which the invention is embodied. Fig. 2 is a vertical longitudinal section of the same. Fig. 3 is a reverse plan view of the plank and cover that supports the tank. Fig. 4 is a transverse sectional view.

Referring to the drawings by letter, A designates a rectangular box or trough having the short partial cover B at one end, upon which cover is the barrel or tank C.

D is a plank having its edge $d$ hinged to the inner edge of the cover B, the hinges being on the lower side thereof. The adjoining edges of the cover B and plank are notched centrally, as at $d'$ $d'$, for the passage of a rubber tube, hereinafter more fully described.

The trough A is provided with a central cover, $a$, extending over the plank, and with a partition, E, provided with the water-openings $e$ adjacent to the free end of the plank.

F is a downwardly curved or bent tube opening into the tank near its bottom, and G is a rubber tube attached to the end thereof and descending into the trough through the notches $d'$, which are on the lower surfaces of the cover B and plank D only. The hinges are preferably made of looped wire, as shown in Fig. 3; but any cheap hinges may be used. The notches allow the end of the rubber tube to swing both laterally and longitudinally.

H is a wire guard secured to the cover B to prevent the rubber tube from swinging too far inward. The plank B has the function of a float, and when the water rises to a certain height in the trough the plank or float rises therewith, and its hinged edge bearing on the rubber tube compresses the latter, and thereby cuts off the water. When the level of the water descends, the downward movement of the float or plank releases the rubber tube and permits the water to flow again.

The cover $a$ over the plank prevents the cattle from putting their feet on the latter and breaking the hinges or in other ways interfering with the operation of the apparatus.

The device is simple, durable, and effective, and can be made very cheaply.

Having described my invention, I claim—

The combination, with the trough having the partition E, provided with openings $e$, of the partial covers $a$ and B, the latter having its edge notched at $d'$ of the tank, the curved tube opening into the same, the rubber tube depending from said tube, and the hinged plank or float having its edge notched oppositely to the notch $d'$ of the partial cover B, substantially as specified.

In testimony that I claim the foregoing as my own I have hereto affixed my signature in presence of two witnesses.

WILLIAM EDGAR HASKINS.

Witnesses:
WM. RIDDELL,
SARAH L. PLACHER.